(12) United States Patent
Jemiolo et al.

(10) Patent No.: US 10,762,292 B2
(45) Date of Patent: Sep. 1, 2020

(54) SYSTEMS AND METHODS FOR COLLABORATIVE EDITING OF INTERACTIVE WALKTHROUGHS OF CONTENT

(71) Applicant: salesforce.com, inc., San Francisco, CA (US)

(72) Inventors: Daniel Everett Jemiolo, Cary, NC (US); John Kucera, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 16/114,943

(22) Filed: Aug. 28, 2018

(65) Prior Publication Data
US 2019/0079910 A1 Mar. 14, 2019

Related U.S. Application Data

(63) Continuation of application No. 14/537,868, filed on Nov. 10, 2014, now Pat. No. 10,089,286.

(60) Provisional application No. 61/970,306, filed on Mar. 25, 2014.

(51) Int. Cl.
*G06F 40/197* (2020.01)
*G06Q 10/10* (2012.01)
*G06F 40/169* (2020.01)

(52) U.S. Cl.
CPC .......... *G06F 40/197* (2020.01); *G06F 40/169* (2020.01); *G06Q 10/101* (2013.01)

(58) Field of Classification Search
CPC ...................................................... G06F 17/22
See application file for complete search history.

(56) References Cited

U.S. PATENT DOCUMENTS

| | | | |
|---|---|---|---|
| 5,577,188 A * | 11/1996 | Zhu | G06F 3/14 |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |

(Continued)

OTHER PUBLICATIONS

Prabaker et al., "An Evaluation of Using Programming by Demonstration and Guided Walkthrough Techniques for Authoring and Utilizing Documentation", Apr. 2006, ACM, pp. 241-250 (Year: 2006).*

(Continued)

*Primary Examiner* — James J Debrow
(74) *Attorney, Agent, or Firm* — Holland & Hart LLP

(57) ABSTRACT

The technology disclosed supports content collaboration between any number of users and systems by constructing WYSIWYG (What You See Is What You Get) outputs of changes proposed by the users to a shared live application or to a document such as code, text, or graphics. The technology disclosed allows authors to update consumer facing content instantaneously based on walkthrough feedback from other contributors or coauthors. Further, the authors, without requiring technical expertise of a developer, can immediately see the consequences of incorporating changes suggested by the contributing authors, based on the WYSIWYG outputs of the changes proposed by the authors.

17 Claims, 8 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| 6,340,977 B1* | 1/2002 | Lui et al. ................ G06F 3/00 |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,156,115 B1 | 4/2012 | Erol et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0005235 A1 | 1/2008 | Hedge et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0300527 A1* | 12/2009 | Malcolm et al. ........ G96F 3/048 |
| 2010/0095198 A1 | 4/2010 | Bultrowicz |
| 2011/0029443 A1* | 2/2011 | King et al. ............. G06Q 50/00 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0089659 A1 | 4/2012 | Halevi et al. |
| 2012/0233137 A1 | 9/2012 | Jakobson et al. |
| 2012/0284644 A1* | 11/2012 | Sitrick et al. ............ G06F 3/01 |
| 2012/0290407 A1 | 11/2012 | Hubbard et al. |

(56) References Cited

U.S. PATENT DOCUMENTS

| | | |
|---|---|---|
| 2013/0212497 A1 | 8/2013 | Zelenko et al. |
| 2013/0247216 A1* | 9/2013 | Cinarkaya et al. |
| 2013/0326330 A1* | 12/2013 | Harris et al. ............ G06F 17/00 |
| 2014/0032489 A1* | 1/2014 | Hebbar et al. ........... G06F 3/048 |
| 2014/0195302 A1* | 7/2014 | Yopp et al. ......... G06Q 30/0204 |
| 2015/0193328 A1 | 7/2015 | Deakin et al. |

OTHER PUBLICATIONS

Bertelsen, "The Activity Walkthrough: an expert review method based on activity theory", 2004, ACM, pp. 251-254 (Year: 2004).*

Hundhausen et al., "The Prototype Walkthrough: A Studio-Based Learning Activity for Human-Computer Interaction Courses" 2011, ACM, pp. 117-124 (Year: 2011).*

* cited by examiner

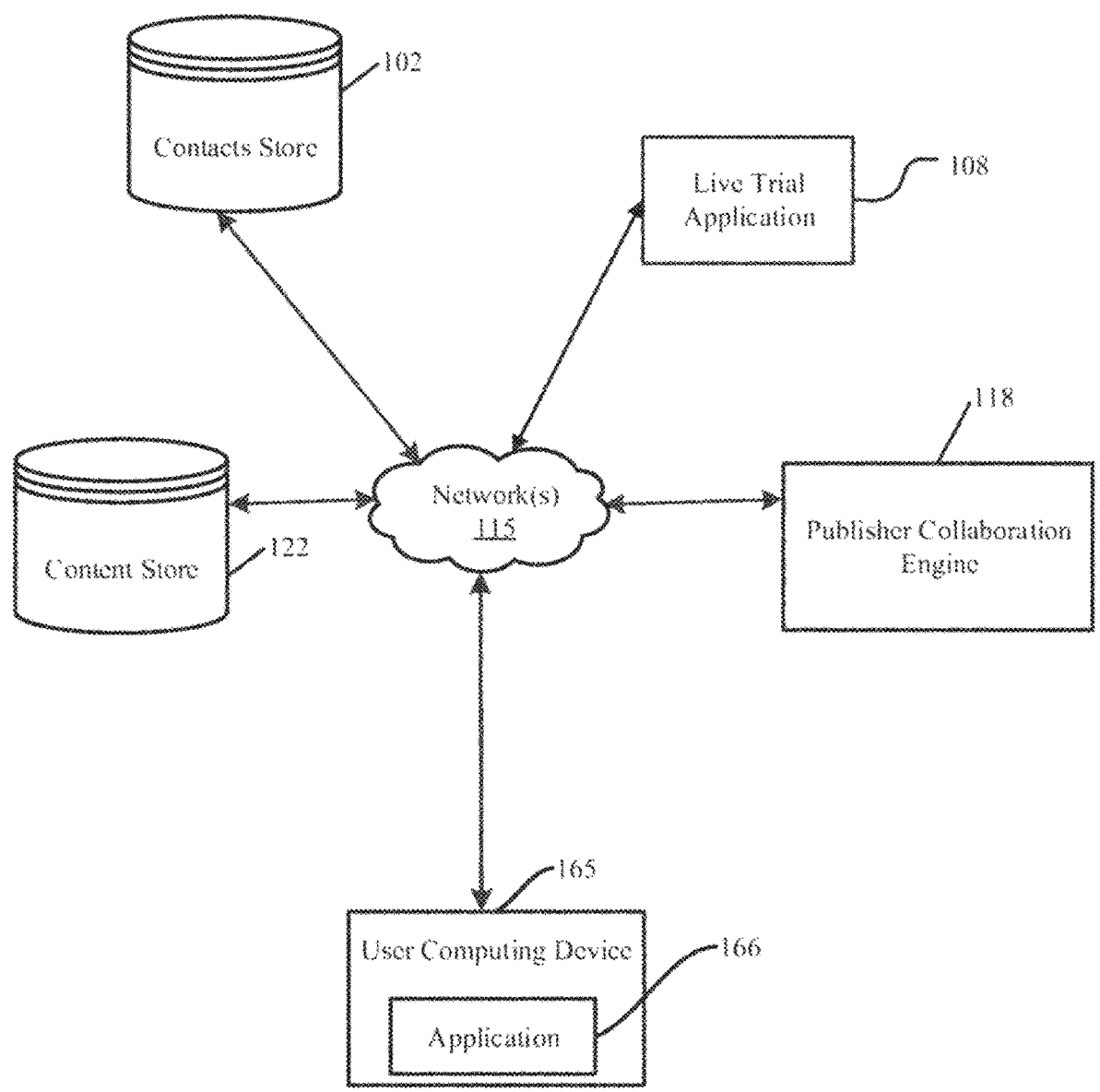
FIG. 1 Collaboration Environment

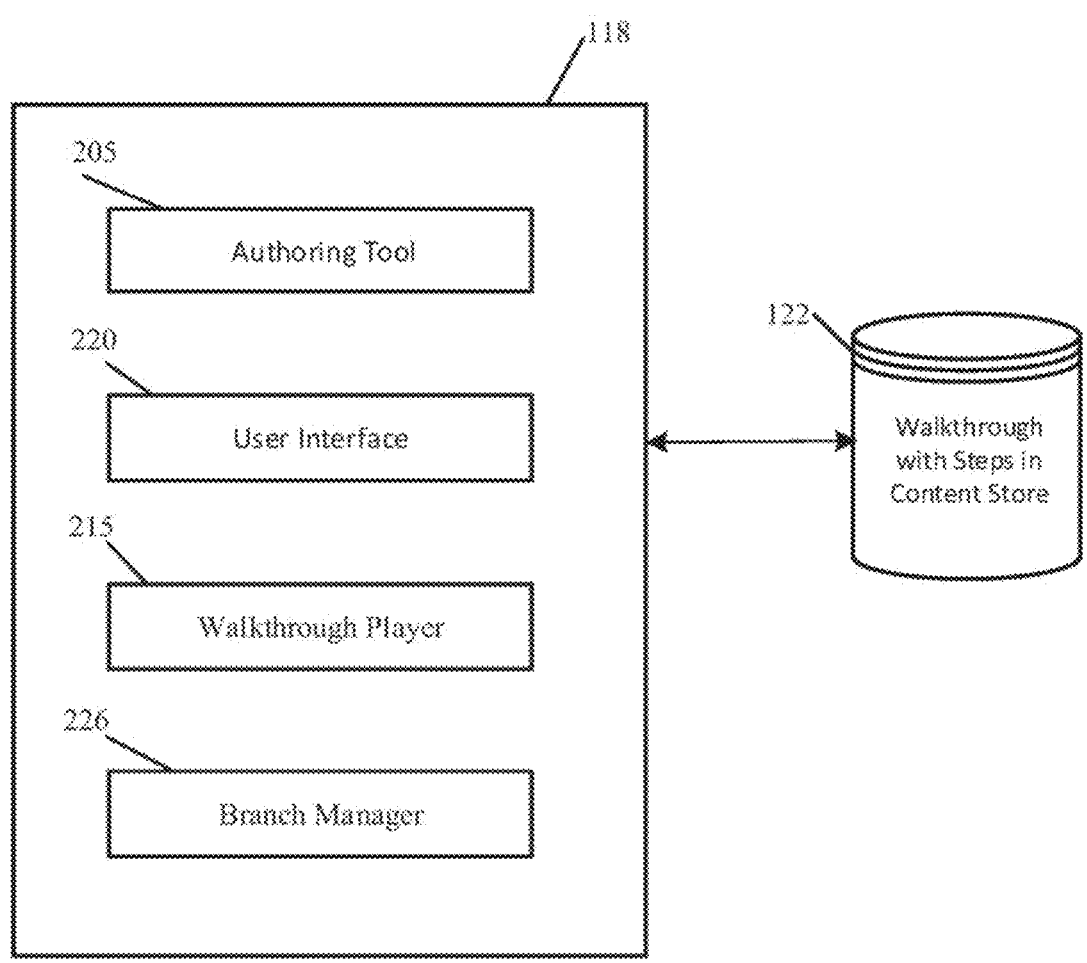
FIG. 2 Publisher Collaboration Engine Block Diagram

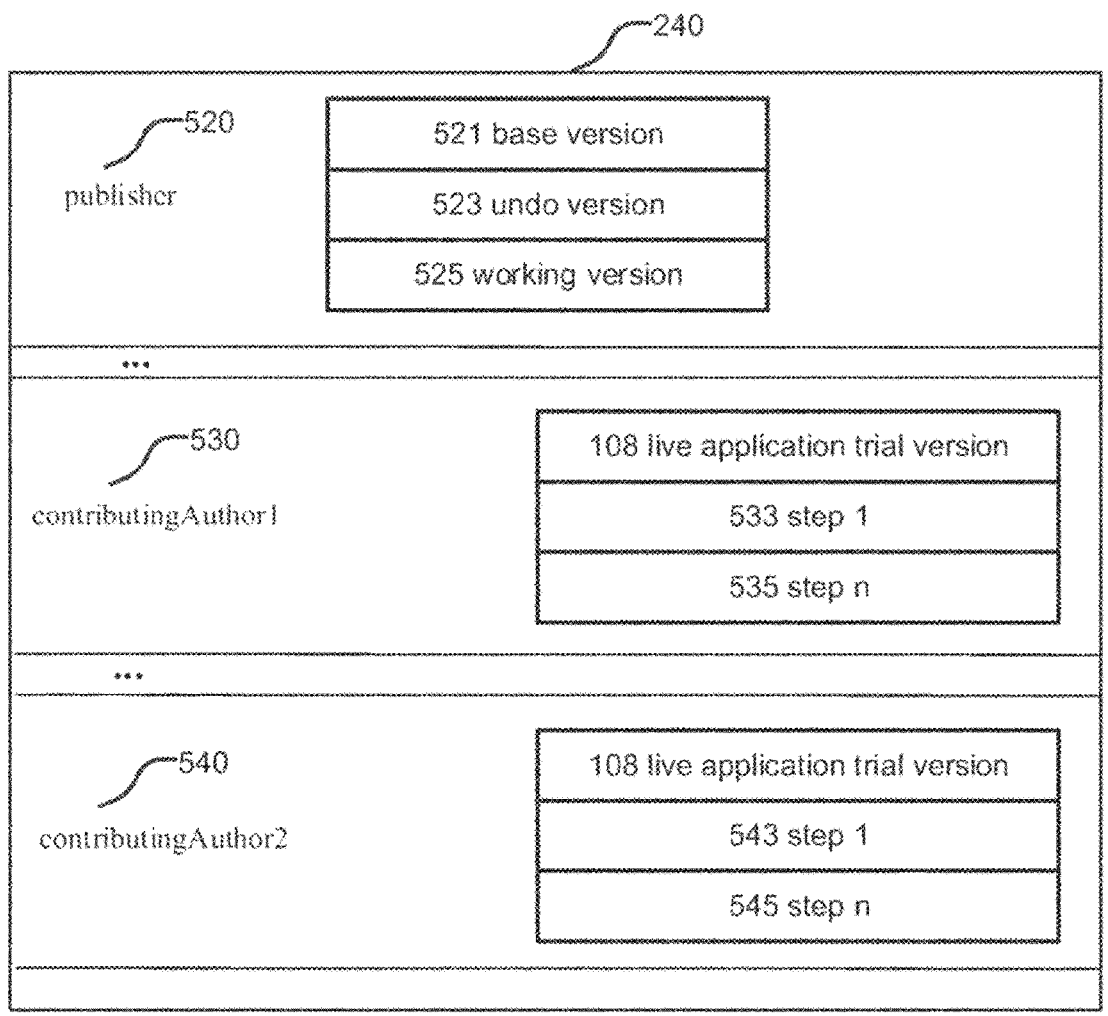
FIG. 5a Walkthrough and Step Data Store
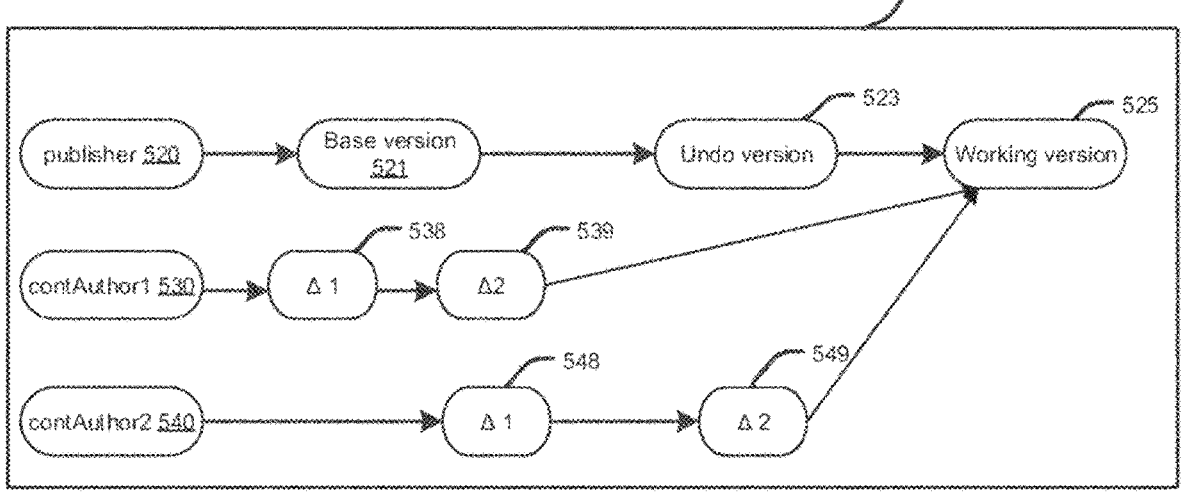
FIG. 5b Walkthrough Version Updates over time

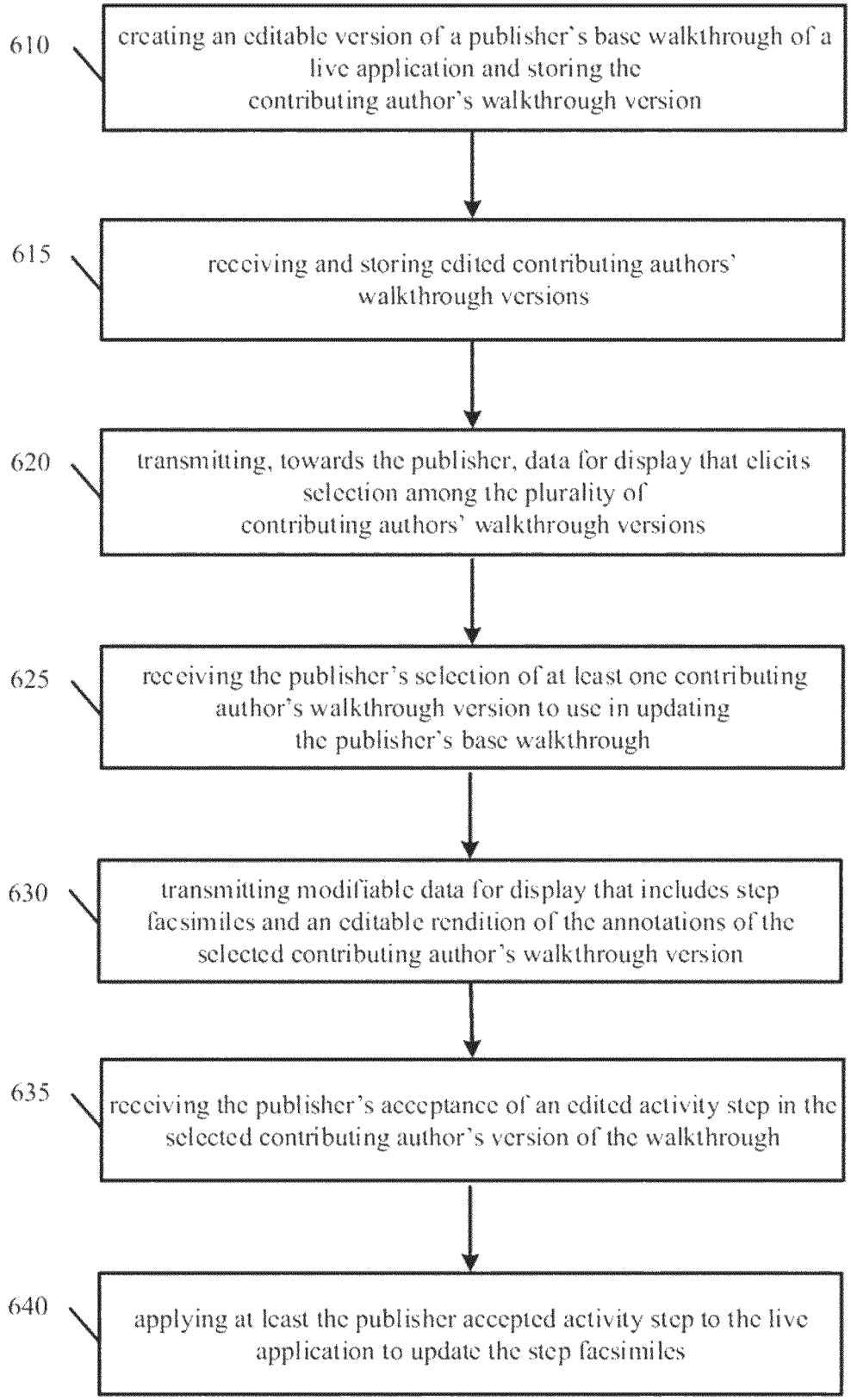
FIG. 6 Flowchart of Efficient Collaborative Editing of Content

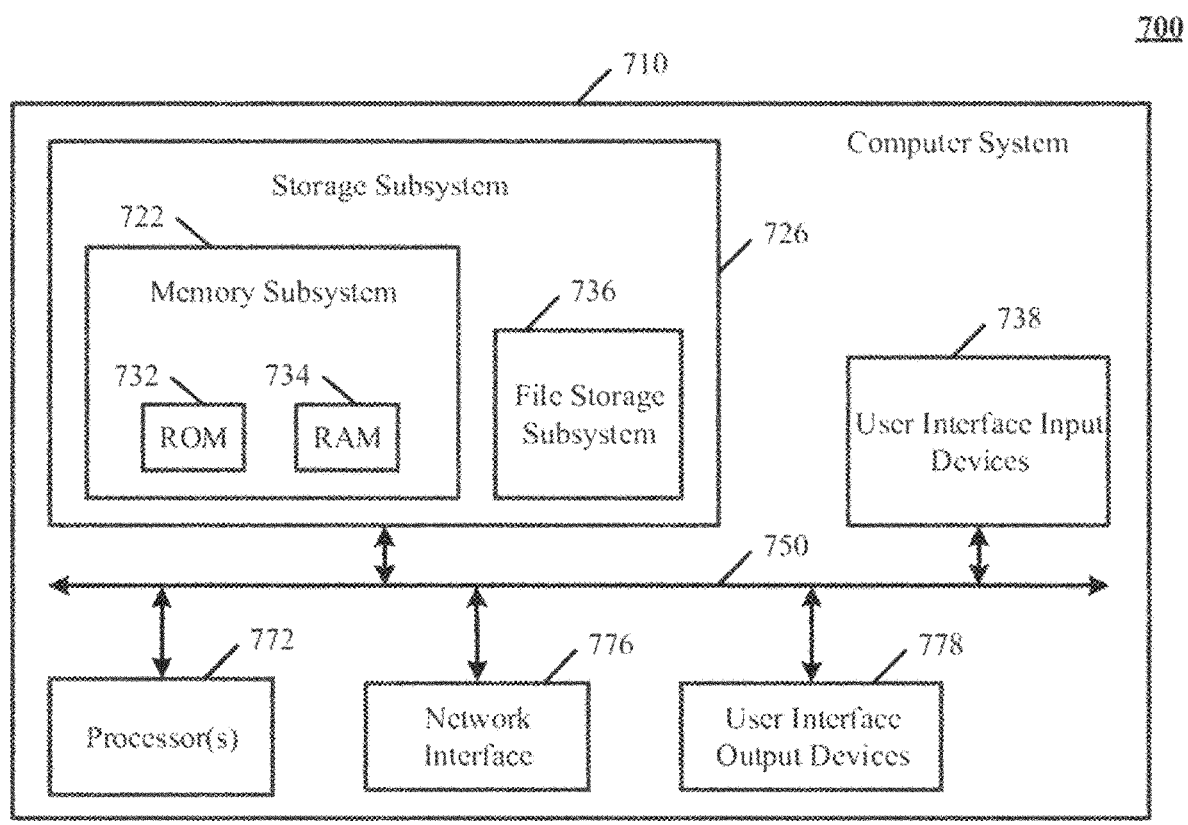
FIG. 7 Computer System

SYSTEMS AND METHODS FOR COLLABORATIVE EDITING OF INTERACTIVE WALKTHROUGHS OF CONTENT

CROSS REFERENCES

The present application for patent is a Continuation of U.S. patent application Ser. No. 14/537,868 by Jemiolo et al., entitled "Systems And Methods For Collaborative Editing Of Interactive Walkthroughs Of Content," filed Dec. 29, 2014, which claims priority to U.S. Provisional Patent Application No. 61/970,306 by Jemiolo et al., entitled "Systems And Methods For Collaborative Editing Of Interactive Walkthroughs Of Content," filed Mar. 25, 2014, assigned to the assignee hereof.

BACKGROUND

The technology disclosed supports content collaboration between any number of users and systems by constructing WYSIWYG (What You See Is What You Get) outputs of changes proposed by the users to a shared live application or to a document such as code, text, or graphics. The technology disclosed allows authors to update consumer facing content instantaneously based on walkthrough feedback from other contributors or co-authors. Further, the authors, without requiring technical expertise of a developer, can immediately see the consequences of incorporating changes suggested by the contributing authors, based on the WYSIWYG outputs of the changes proposed by the authors.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates one implementation of a collaboration environment;

FIG. 2 illustrates a block diagram of one implementation of a collaboration environment;

FIG. 5a-5b show data structures for one implementation of a collaboration environment;

FIG. 6 is a flowchart of one implementation of efficient collaborative editing of content;

FIG. 7 is a block diagram of an example computer system used to efficiently collaborate when editing content;

DETAILED DESCRIPTION

Figure 3A:
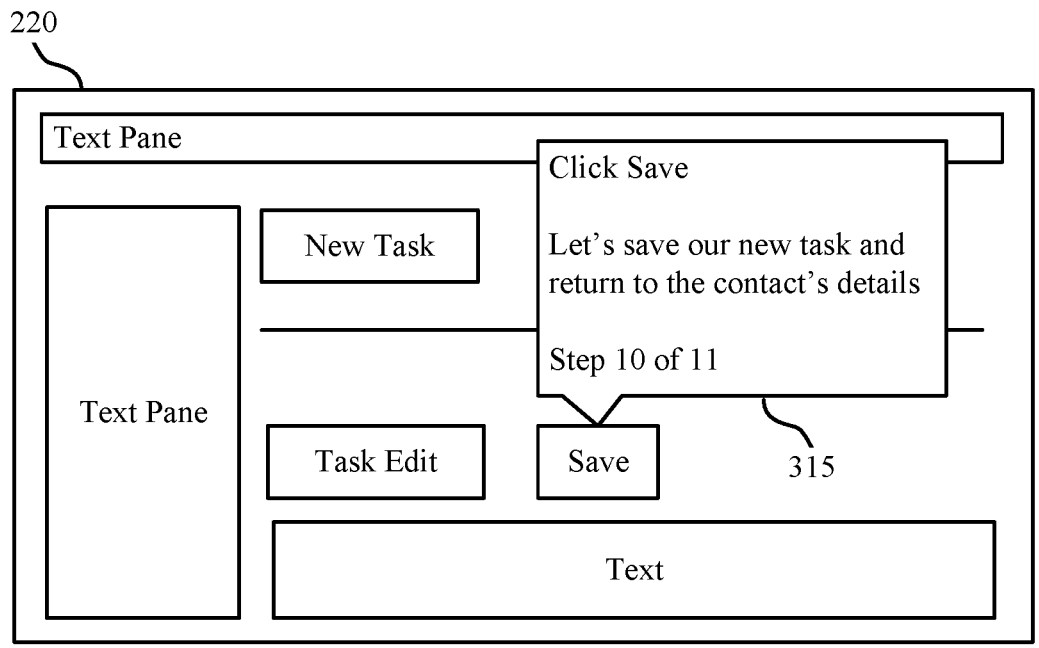
FIG. 3a-3b show examples of GUI interface for a collaboration environment.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to efficient collaborative editing of content by using computer-implemented systems. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "dependent on" a predecessor signal, event or value if the predecessor signal, event or value influenced the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Responsiveness" of a given signal, event or value upon another signal, event or value is defined similarly.

In software engineering, a walkthrough is a review in which software design is reviewed by stepping through its operation, such as by a live interactive demonstration. Code walkthroughs refer to peer review of code. Typically, a developer invites his technical lead, a database administrator, product manager, or another peer to review a set of source modules prior to product implementation. Traditionally, the modified code is indicated on a hardcopy listing with annotations or a highlighting pen, or within the code itself with comments. However, these techniques of document review are difficult, tedious, time-consuming, and error-prone.

The technology disclosed solves the technical problem of reviewing source code by facilitating walkthroughs in a WYSIWYG (What You See Is What You Get) environment. In a WYSIWYG environment, content displayed on screen during editing appears in a form exactly corresponding to its appearance when printed or displayed as a finished product, which can be an executed code, printed document, web page, or slide presentation. In some implementations, it allows an author to view something very similar to the end result while the document is being created, by enabling the author to directly manipulate the layout of a document without having to type code or remember names of layout commands. In other implementations, a WYSIWYG environment is a graphical user interface (GUI) through which the user interacts with a live trial of an end product.

Walkthrough authoring is a multi-person endeavor. In some instances, product managers create the general overview, content, themes, and some text, while document writers help perfect the text, clarify order, etc. A usability team also reviews the documents to ensure that the walkthrough is meeting its stated goals. Thus, walkthrough authors need to incorporate input from numerous people before declaring a walkthrough "finished."

Existing authoring and collaboration tolls make it very cumbersome to merge changes and decisions proposed by contributors and co-authors of a document. More importantly, the author does not know the consequences of a proposed change until the given phase of software development is completed.

In one example, a user interface shows a list of actions that a prospect performs to finish a walkthrough (e.g. "create a new opportunity"). These actions are created in the authoring tool by the original author; she decides what will be clicked on and when, as well as some draft text to describe to the prospect what is happening at each action. From there, one or more reviewers (or co-authors) can see the same list of actions or editable steps and add the following:

1. General comments and suggestions about each action,
2. Changes to action text,
3. Changes to part of the underlying application the action refers to, and
4. Changes to other behavior within the action, as allowed by the underlying walkthrough code (e.g. dialog appears on left side of button instead of right).

In some implementations of the technology disclosed, these changes are not applied directly to the original author's work. Instead, they are part of a branch (walkthrough step) that is implicitly created for each co-author or contributor. The branch of the walkthrough starts with the original author's work and is then modified with their comments and/or proposed changes. Other co-authors can create similar branches of the walkthrough with steps containing comments and changes, according to other implementations. In yet other implementations, a branch is a copy or a new version of the author's original work.

In some other implementations, the original author can toggle the walkthrough to include or exclude proposed changes from the branches at an individual step level or an entire walkthrough level. For example, Anna is authoring a IO-step walkthrough (WT). Joe proposes text changes to steps 2, 3, and 5. He also proposes changing the position of a dialog in step 9. Jackie also reviews the WT and wants to reorder steps 3 and 4 and disagrees with the text changes to 5, proposing her own text. When Anna next views her walkthrough in the authoring tool, she can see Joe and Jackie's work in parallel to her own. She first tries to swap in all of Joe's changes to see what they look like. She does the same with Jackie's changes; she also looks at certain changes in isolation. She is able to preview the end results in all cases as WYSIWYG outputs without modifying his original content.

Anna decides Joe is right about steps 2 and 3, and Jackie is right about the order of 3 and 4. She thinks they're both wrong on step 5. She incorporates the changes by pulling in (merging) the individual comments and changes to the original content and then re-publishing so that her co-authors can see the updated work (and continue arguing with him about step 5). As changes are accepted and rejected, the branches disappear (Anna's walkthrough shows the selected steps), simplifying Anna's view of the final content. As a result, authors can test out and incorporate changes without actually changing the underlying content, in one implementation. In another implementation, they can toggle in-part or in-whole the proposals of others to quickly see which is better.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

Collaboration Environment

FIG. 1 illustrates one implementation of a collaboration environment 100. FIG. 1 shows that collaboration environment 100 can include contacts store 102, live application trial version 108, content store 122, and WYSIWYG publisher collaboration engine 118. In other implementations, collaboration environment 100 may not have the same elements as those listed above and/or may have other/different elements instead of, or in addition to, those listed above.

The contacts store 102 can hold business-to-business contacts such as accounts, contacts and leads along with supplemental information. In some implementations, this supplemental information can be names, addresses, number of employees and other contact-related information. This store identifies different authors and co-authors of content stored in content store 122.

Content store 122 can include both walkthroughs and content use by the live application trial version. Different data types such as free-form text, structured text, and/or unstructured text can be stored. In some implementations, content store 122 includes technical documents, source code, graphics, contacts, etc. Data related to a walkthrough includes the code that powers the walkthrough and can include WYSIWYG outputs or thumbnails of step facsimiles of pages generated when the walkthrough interacts with the live application. Proposed changes by contributing authors to the publisher's base version of the walkthrough are also stored in content store 122. Different branches or versions of a publishing author's original work, such as walkthrough source code or documents are created using publisher collaboration engine 118 and stored in content store 122 along with an identification of the publishing author (authorID) and contributing author (contributorID).

The publisher collaboration engine 118 creates WYSIWYG outputs or step facsimiles of changes proposed by a contributing authors. When proposed changes alter the order of steps or the interaction between the walkthrough code and the live application, the collaboration engine further creates updated illustrations in WYSIWYG format. In one implementation, WYSIWYG presentations of a document are made using print preview windows. In other implementations, publisher collaboration engine 118 creates a step facsimile of a user interface that represents objects invoked by the walkthrough source code or produced by the live application under direction of the walkthrough. This user interface step facsimile is presented to the author alongside editable content or walkthrough messages that the publisher or contributing author is reviewing, so they can view the consequences of the proposed changes on the finished outputs of the content via the application 166 running on a user computing device 165.

In some implementations, a publisher collaboration engine 118 can be communicably coupled to a user computing device 165 via different network connections, such as the Internet or a direct network link. In some implementations, user computing device 165 can be a personal computer, laptop computer, tablet computer, smartphone, personal digital assistant (PDA), digital image capture device, and the like.

Live application trial version 108 and application 166 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on premise environment. In one implementation, live application trial version 108 and application 166 can be accessed from a browser running on a computing device. The browser can be Chrome, Internet Explorer, Firefox, Safari, Opera, and the like. In other implementations, application 166 can run as an engagement console on a computer desktop application.

In some implementations, network(s) 115 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), ZWave, ZigBee, or other appropriate configuration of data networks, including the Internet.

In some implementations, the engines can be of varying types including workstations, servers, computing clusters, blade servers, server farms, or any other data processing systems or computing devices. The publisher collaboration engine 118 can be communicably coupled to the databases via a different network connection. For example publisher collaboration engine 118 can be coupled via a network 115.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema databases, or any other data storing systems or computing devices.

In other implementations, collaboration environment 100 may not have the same elements or components as those listed above and/or may have other/different elements or components instead of, or in addition to, those listed above, such as a web server and template database. The different elements or components can be combined into single software modules and multiple software modules can run on the same hardware.

Collaboration Block Diagram and Graphical User Interface Components

FIG. 2 shows a block diagram of one implementation of a publisher collaboration engine 118 that includes an authoring tool 205 to load existing walkthroughs. The authoring tool 205 provides the live system appearance in a workspace, exports new or updated walkthroughs, and provides a user interface 220 for editing text and metadata for walkthrough steps. Up-to-date walkthrough and step data are available in content store 122 for the user interface 220. In one implementation, a walkthrough player 215 handles content retrieval, state management, and analytics. The walkthrough player 215 can be implemented as a JavaScript engine that retrieves content, manages state, and serves up callout and sidebar views for the user interface 220. Branch manager 226 manages the selection of step facsimiles, providing updated step information to the walkthrough player 215.

A callout is a visual representation of a walkthrough step, located on the display near the widget(s) needed to perform the step. In a disclosed implementation, a data model that encompasses roles, walkthroughs and steps can be represented as a JSON object. Rather than allow for steps behavior to be customized using free-form JavaScript event handlers or closures, authors and contributors can be presented with a set of pre-packaged behaviors that can be executed and conditions that can be tested when the trials code determines that a step may be finished. The resulting JSON name/value pairs exported by the authoring tool 205 can include enumeration values and selectors that enable these behaviors and conditions, but it will not have the actual implementation of them. In this way, contributing authors are restricted from doing whatever they want within a walkthrough, but they are also saved from having to write JavaScript code to complete a tour.

FIG. 3a shows one implementation of a walkthrough step 10 315, as rendered by a user interface 220. The label key contains localized strings used for display within the callout. The callout text for step 10 is shown in the JSON listed below with these values: "Click Save", and "Let's save our new task and return to the contact's details."

```
{
    id: "010",
    label: "Click Save",
    next: "011",
    help: {
        primary: {
            target: ["input[name='save']"], :first",
            "label": "Let's save our new task and return to the
                contact's details.",
            position: "bl-t",
        },
    },
    startsOn: {
        page: {
            match: true,
            path: "/00T/e. *"
        },
        target: null
    },
    completedWhen: {
        event: "pageLoad",
        target: "/OOT.+",
        autoComplete: true
    }
},
```

Figure 3B:
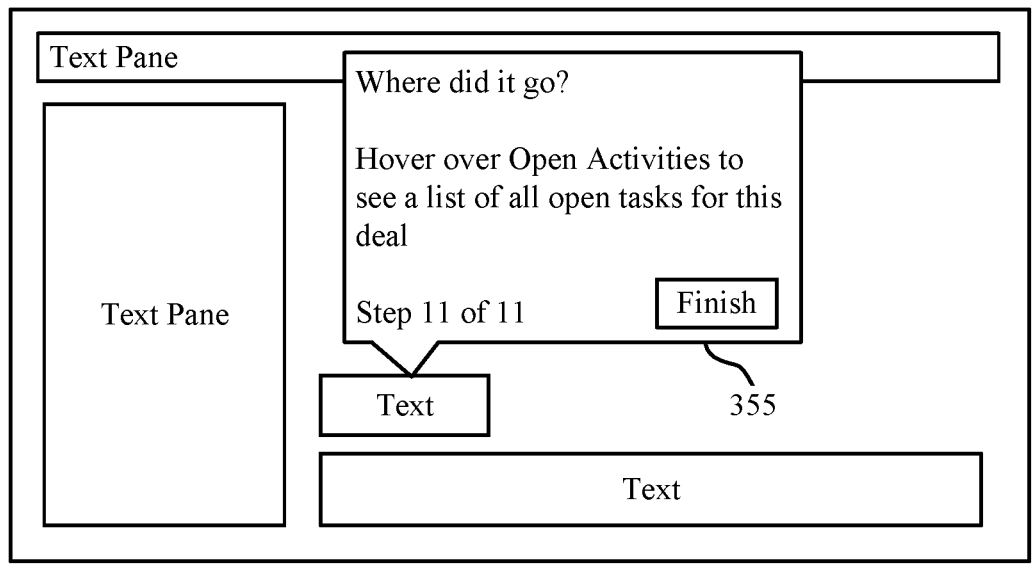

FIG. 3b shows example walkthrough step 11 355. The callout value for step 11 is shown in the JSON listed below: "Where did it go?", and "Hover over Open Activities to see a list of all open tasks for this deal."

```
id: "011",
label: "Where did it go?",
next: "null",
help: {
    primary: {
        "label": "Hover over Open Activities to see a list of all
            open tasks for this deal.",
        target: [
            "a[ids=RelatedActivityList_ Link]"
        ],
        position: "bl-t",
    },
},
```

```
        startsOn: {
            page: {
                match: true,
                path: "/006/e. *"
            },
            target: null
        },
        completedWhen: {
            autoComplete: false
        }
}
```

In one implementation, an authoring interface delivers walkthrough step options via a graphical user interface for contributing authors.

Authoring Interface

Figure 4:
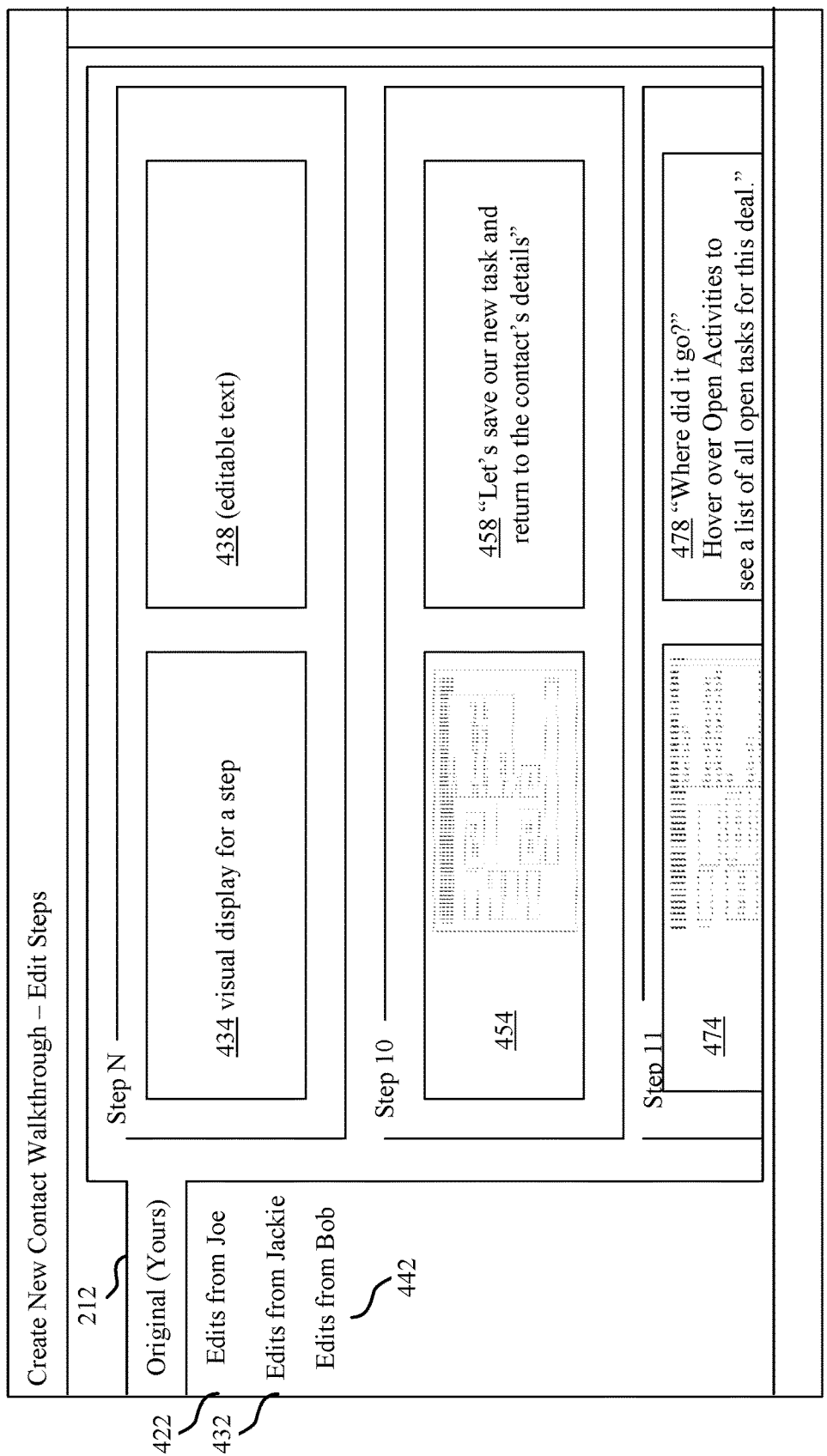
FIG. 4 illustrates one view of an authoring display.

FIG. 4 illustrates one view of an authoring display that provides a step sequence interface. An editable publisher's base walkthrough version shows the steps currently published for a walkthrough—represented on a tab labeled original 412. A step represents one instruction or task within a walkthrough. A visual display of a step 434 shows the appearance, and the editable text 438 window provides an interface for making edits to the key values. Note that walkthrough step 10 315 shows the same visual image as the visual display of a step 454.

Step 10 can be edited via the editable text 458 window—to update the visual display of step 10 454. Similarly, screenshot of a step 474 is a visual representation of step 11. Step 11 can be edited in the editable text 478 window. Note that walkthrough step 11 355 shows the same visual image as the visual display of a step 474.

Using the tabs on the left side of the authoring display 400, a user can choose to view overlays that show desired edits proposed by multiple contributing authors: edits from Joe 422, edits from Jackie 432, or edits from Bob 442. For these contributors, the walkthrough user would see a visual representation and editable text similar to what is shown for original 412. The tabs with edits from the other contributors can flag modified steps and the user would have the option to preview, accept or reject a single change, or all changes together, so that the original author or publisher could get a granular or a comprehensive view of multiple walkthrough versions in a single authoring user interface. That is, the user gains the ability to view combinations of proposed features by multiple contributors—seeing the full implications of accepting some or all of the collaborators' changes.

For an interactive walkthrough using an authoring display, contributors can be presented with a set of pre-packaged behaviors that can be executed and conditions that can be tested when the live application trial version 108 determines that a step may be finished. In this way, authors can be restricted from doing whatever they want within a walkthrough, but they can also be saved from needing to write any code to complete a tour of a version of a project.

Walkthrough Implementation

In a disclosed implementation, a data model that encompasses roles, walkthroughs and steps can be represented as a JSON object. The role of a prospective user may be dependent on the type of job the prospect has within their company. In the example code shown below, the role of sales rep is set up for two walkthroughs: to create a new contact and to share files. A sidebar is a vertical overlay that appears on the right side of our example walkthrough display, providing access to role, walkthrough, and step information.

Within the role code, the "label" key value pair specifies a localized string to be used for display within the sidebar.

```
role= {
    id: "sales-rep",
    label: "Sales Rep",
    avatar: "/images/trials/roles/ sales-rep. png",
    walkthroughs: [
        {
            id: "create-new-contact",
            label: "Create a new contact",
            version: "1.0"
        },
        {
            id: "share-files",
            label: "Share files",
            version: "1.1"
        }
    ]
}
```

In one implementation, a walkthrough for creating and assigning a task can be enacted via the example JSON shown below. A callout is a visual representation of a step, located on the display near the widget(s) needed to perform the step. The target is the on-screen widget(s) needed to perform a step. "ID" uniquely identifies the walkthrough within the system. By providing the "version" of the authoring tool used to produce the walkthrough definition, the user interface can continue loading older tours that do not use the latest tooling. "Messages" contain a collection of text for overarching events that are not specific to a step. For example, they include the success and failure messages for a prospect.

```
walkthrough = {
    id: "create-assign-task",
    label: "Create and Assign a Task",
    version: "1.0",
    messages: {
        success: "Your new task has been assigned. Great job!",
        failure: "Your changes could not be saved. Please try again."
    },
```

Key-value pairs describe the steps with keys common among the steps, and with values specific to a step. Steps include an "id": in the example code, the steps are numbered 00000001, 00000002, etc. The "previous" key-value pair shows which step would precede a step. If the "previous" value is null, then the step defaults to be the first step in the walkthrough. The "next" key-value pair shows the step(s) that can follow the given step. When the "next" value is null, the step is the last one in the walkthrough. For example, for step 00000001, the code shows that the next step can be either 00000002 or 00000005.

The "help" key-value pair includes a collection of two objects that identify the element(s) that will be highlighted, and optional supplementary text. Primary is required. If completedWhen for this step evaluates to FALSE, and the target in primary is found when the step first loads, then this label, position, and highlight are displayed to the user. Secondary is optional. If completedWhen for this step evaluates to FALSE, and the target for primary is not visible, and the target for secondary is visible, then the secondary label, position, and highlight are displayed to the user. Skipped is also optional. If completedWhen for this step evaluates to TRUE, then skipped is used as the target instead of primary. Within all the help sub-objects, there will be position and highlight key-value pairs. The "position" is formatted as {from}-{to}, meaning that the callout will position its {from} area near the target's {to} area. For example, in step 00000001, position is "t-b" to specify 'top' to 'bottom' position for the callout.

The "startsOn" code indicates what web page the prospect must be on and/or what "targets" must be present in order for a step to be started/displayed. When page match is true, the prospect must be on the path specified for the step to begin. When false, the prospect must not be on the path specified for the step to begin. Path is the URL to which match is applied. When target match is true, the prospect must be on a page that contains the elements identified in the path key value for the step to begin. When false, the prospect must be on a page not containing the elements identified in path for the step to begin. Path includes elements such as a CSS class to which match is applied. Target is useful for scenarios in which the URL does not change, yet prospects could decide to bail on the walkthrough by clicking somewhere that does not change the URL but is not the next step desired.

The "completedWhen" code indicates when a step is considered done so that the tour can automatically close that step and move on to the next one. The autoComplete event value indicates whether the step has a "next" button requiring the prospect to click the callout to proceed, or tries to automatically progress to the next step when the designated event has occurred. When false, the player will not automatically proceed to the next step. Instead, a "next" button will appear in the callout requiring the prospect to click the button to proceed. Event and Target are not evaluated when autoComplete is set to false, and can be omitted. When true, the player will proceed to the next step automatically when the event condition is met. There is no "next" button in the callouts. When autoComplete is true, the event designates what the player checks for in order to automatically progress to the next step. The following supported events implement transmitting controls: pageLoad for use when the desired action loads a new page with a known URL pattern such as a tab or record detail; is Visible for use when the desired action makes a unique target appear such as dragging a chart to the canvas, which results in a placeholder image appearing; isHidden for use when the desired action will hide a unique target such as dragging a report over an empty chart, which results in a placeholder chart image disappearing; valueEntered to be applied to any HTML input element, not just those that take direct text input. When autoComplete is true and the event is isHidden or is Visible or valueEntered, the target indicates where the event needs to occur to progress.

Step one of a "create and assign a task" walkthrough is to go to the opportunities page. Step two creates an opportunity, as can be seen in the label value shown in the code below.

```
steps: [{id: "00000001",
    label: "Go to the Opportunities page",
    previous: null, next: ["00000002", "00000005"],
    help: {
        primary: {
            target: ["li[id='Opportunities Tab']"],
            label: "Click the highlighted tab.",
            position: "t-b",
            highlight: "b"
        },
        secondary: {
            target: ["#MoreTabs_Tab"],
            label: "Click the+ to see tabs that don't fit on the screen.",
            position: "t-b", highlight: "b"
        },
        skipped: {
            target: ["li[id='Opportunities Tab']"],
            label: "You're already in the right place. For future reference, take note of the highlighted tab.",
            position: "t-b", highlight: "b"
        }
    },
    startsOn: {
        page: {
            match: false,
            path: "/006/o"
        },
        target: null
    },
    completedWhen: {
        event: "pageLoad",
        target: "/006/o",
        autoComplete: true
    }
},
{   id: "00000002",
    label: "Create an opportunity",
    previous: "00000001 ", next: "00000003",
    help: {
        primary: {
            target: ["input[ name='new']"],
            label: "You'll first need to create an opportunity",
            position: "1-r", highlight: "b"
        },
        secondary: null,
        skipped: null
    },
    startsOn: {
        page: {
            match: true,
            path: "/006/o"
        },
        target: {
            match: false,
            path: "a[href='006']"
        }
    },
    completedWhen: {
        event: "pageLoad",
        target: "/006/e. *",
        autoComplete: true
    }
},
```

The third step of a "create and assign a task" walkthrough is to "fill in the fields important to you." The key-value pairs noted above describe the following steps as well, with values specific for these steps. For example, for step 3 below, the previous step value is step 2 and the next is step 4.

```
{   id: "00000003 "'
    label: "Fill in the fields important to you",
    previous: "00000002", next: "00000004",
    help: {
        primary: {
            target: ["#head_l_ep"],
            label: "Salesforce provides plenty of fields to help you search through opportunities later. For now, let's just enter the required ones.",
            position: "c-c", highlight: "b"
        },
        secondary: null,
        skipped: null
    },
    startsOn: {
        page: {
            match: true,
            path: "/006/e. *"
        },
        target: null
```

```
        },
        completedWhen: {
            event: "valueEntered",
            target: ["#opp3", "#opp4", "#opp9", "#opp1 1 "],
            autoComplete: false
        }
    }
},
```

The fourth step of a "create and assign a task" walkthrough is to "click the save button", and the fifth step is to "select an opportunity".

```
{   id: "00000004",
    label: "Click the Save button",
    previous: "00000003 ", next: "00000006",
    help: {
        primary: {
            target: ["input[ name=' save']"],
            label: null,
            position: "1-r",
            highlight: "b"
        },
        secondary: null,
        skipped: null
    },
    startsOn: {
        page: {match: true,
            path: "/006/e. *"
        },
        target: null
    },
    completedWhen: {
        event: "pageLoad",
        target: "/006\w+",
        autoComplete: true
    }
},
{   id: "00000005'"
    label: "Select an opportunity",
    previous: "00000001 ", next: "00000006",
    help: {
        primary: {
            target: ["a[href='006']"],
            label: "Click one of these links to open any of the existing opportunities.",
            position: "r-c", highlight: "l"
        },
        secondary: null,
        skipped: null
    },
    startsOn: {
        page: {
            match: true,
            path: "/006/o"
        },
        target: {
            match: true,
            path: ["a[href='006']"]
        }
    },
    completedWhen: {
        event: "pageLoad",
        target: "/006\w+",
        autoComplete: true
    }
},
```

The sixth step of a "create and assign a task" walkthrough is to "find the open activities section". Step seven is to "click the new task button".

```
{   id: "00000006'"
    label: "Find the Open Activities section",
    previous: ["00000004", "00000005"], next: "00000007",
```

```
    help: {
        primary: {
            target: ["h3 [ id$='RelatedActivityList_ title'"],
            label: "You may need to scroll down to see this section.",
            position: "c-r", highlight: "b"
        },
        secondary: null, skipped: null
    },
    startsOn: {
        page: {
            match: true,
            path: "/006\w+"
        },
        target: null
    },
    completedWhen: {
        event: "pageLoad",
        target: "/006\w+",
        autoComplete: false
    }
},
{   id: "00000007'"
    label: "Click the New Task button",
    previous: "00000006", next: "00000008",
    help: {
        primary: {
            target: ["input[ name='task']"],
            label: null,
            position: "1-r", highlight: "l"
        },
        secondary: null,
        skipped: null
    },
    startsOn: {
        page: {
            match: true,
            path: "/006\w+"
        },
        target: null
    },
    completedWhen: {
        event: "pageLoad",
        target: "/OOT/e.*",
        autoComplete: true
    }
},
```

Step eight of a "create and assign a task" walkthrough is to note the relationship that has been created. In this step, highlight: "b" specifies the addition of a line on the bottom of the target. Step nine is to "fill in the required fields". Note that step nine successfully completes when the values have been entered.

```
{   id: "00000008",
    label: "Note the relationship that's been created",
    previous: "00000007", next: "00000009",
    help: {
        primary: {
            target: ["#tsk3_top"],
            label: "By clicking New Task from the Opportunity page, your new task is automatically associated with that opportunity.",
            position: "1-r", highlight: "b"
        },
        secondary:
        null, skipped:
        null
    }
    startsOn: {
        page: {
            match: true,
            path: "/OOT/e. *"
        },
        target: null
    },
```

```
        completedWhen: {
            event: "pageLoad",
            target: "/OOT/e.*",
            autoComplete: false
{   id: "00000009"'"
    label: "Fill in the required fields",
    previous: "00000008", next: "000000010",
    help: {
        primary: {
            target: ["#head_1_ep"],
            label: "By default, the new task is assigned to you. If
            you've added other users during your trial, you can assign
            to them as well.",
            position: "c-c", highlight:
            "|"
        }
        secondary: null,
        skipped: null
    },
    startsOn: {
        page: {
            match: true,
            path: "/OOT/e. *"
        },
        target: null},
        completedWhen: {
            event: "valueEntered",
            target: ["#tsk5", "#tskl "],
            autoComplete: false
        }
    },
```

Step ten of a "create and assign a task" walkthrough is to "click the save button"; and step eleven is to "use your Chatter feed to track this task". Step eleven is the finishing step of the "create and assign task" walkthrough example.

```
{   id: "00000010",
    label: "Click the Save button",
    previous: "00000009",
    next: "00000011 ",
    help: {
        primary:
            {target: ["input[ name='save']"],
            label: null,
            position: "t-b",
            highlight: "b"
        },
        secondary: null,
        skipped: null
    },
    startsOn: {
        page: {
            match: true,
            path: "/OOT/e. *"
        },
        target: null
    },
    completedWhen: {
        event: "pageLoad",
        target: "/OOT.+",
        autoComplete: true
    }
},
{id: "00000011 '"
    label: "Use your Chatter feed to keep track of this task",
    previous: "00000010",
    next: null, help:
    {
        primary: {
            target: ["#feedLinks"],
            label: "When you come across tasks that require special
            attention, your feed can ensure you get real time updates
            about comments and status."
        },
        secondary: null,
```

```
            skipped: null
        },
        startsOn: {
            page: {
                match: true,
                path: "/OOT.+"
            },
            target: {
                match: true,
                path: ["#feedLinks"]
            }
        },
        completedWhen: {
            event: "pageLoad",
            target: "OOT.+",
            autoComplete: false
        }
    }
    ]
}
```

Walkthrough Authoring Data Store

FIG. 5a shows one implementation of a walkthrough with step data in a content store 122. A walkthrough publisher 520 completes a base version 521 for walkthroughs of a live application trial version 108 by prospects. The data store includes an undo version 523 that contains comments and changes. A working version 525 of a walkthrough includes all changes accepted by the publisher. In one implementation, contributing author 1 530 may enter author 1 step 1 533 to author 1 step n 535 when completing a trial walkthrough of an author 1 applicable product 531; contributing author 2 540 may enter author 2 step 1 543 to author 2 step n 545 when completing a trial walkthrough of author 2 applicable product 541.

FIG. 5b shows walkthrough version updates over time 560. Contributing authors' walkthrough versions include multiple activity steps for contributing author 1: Δ1 538, Δ2 539, and for contributing author 2: 1 Δ548, and Δ2 S49—of user interaction with interface panels, and annotations to graphically overlay the interface panels for at least some of the activity steps.

Publisher 520 receives and stores edited contributing authors' walkthrough versions in an undo version 523 to potentially use in updating the publisher's base version 521 of the walkthrough. Publisher 520 accepts at least some edited activity steps suggested by contributing authors, and applies at least the publisher accepted activity steps to the live application to update the step facsimile data in the working version 525. Contributors can view the latest-version steps for the walkthrough—the working version 525. Publisher 520 can include applying subsequent-to-the-edited-activity steps to the live application to update step facsimile data for display. In some implementations, first modifiable data and second modifiable display data to be applied to the selected contributing author's walkthrough version are both displayed simultaneously within a single user interface. In other implementations, controls implement drag-and-drop updating of a selected activity of the publisher's base walkthrough version with material from the contributing author's walkthrough version.

Example actions a prospect might take include clicking a button to load a web page, clicking a button to continue to the next step of a walkthrough, and deserting a walkthrough without finishing it. Progress stored for a prospect may include a list of which steps of a walkthrough have been completed, and user data entered by the prospect in a text field. Example instance data for a walkthrough is shown below. The data may include the time a prospect started a walkthrough, the amount of time the prospect paused while completing the walkthrough, the finish time for the prospect, which steps the prospect completed, and the actual concrete path that was used to execute the step—in contrast with the page in the step definition, which could be a regular expression.

```
user= {
    role: "sales-rep",
    ...
    walkthroughs: [
    {
        id: "share-file",
        status: "started",
        startTime: 1234567890,
        pauseTime: null,
        finishTime: null,
        lastModifiedTime: 1234567890,
        steps: [
        {
            id: "10000001 "'
            status: "finished",
            page: null,
            skipped: true
        },
        {
            id: "10000002",
            status: "finished",
            page: "/00xyzabcdef"
            skipped: false
        },
        {
            id: "10000003",
            status: "started",
            page: "/00asdfasdf"
            skipped: false
        },
        ]
    },
    ...
    ]
}
```

Implementation of Collaborative Editing

FIG. 6 is a flowchart 600 of one implementation of efficient collaborative editing of content. Flowchart 600 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 610, for each of a plurality of contributing authors, an editable version of a publisher's base walkthrough version is created and the contributing author's walkthrough version is stored. The walkthrough versions include multiple activity steps of user interaction with interface panels, and annotations to graphically overlay the interface panels for at least some of the activity steps.

Action 615 specifies receiving edits by the contributing authors and store updated contributing author's walkthrough versions.

Action 620 specifies transmitting, towards the publisher, data for display that elicits selection among the plurality of contributing authors' walkthrough versions.

Action 625 specifies receiving the publisher's selection of at least one contributing author's walkthrough version to use in updating the publisher's base walkthrough.

Action 630 specifies transmitting modifiable data for display that includes step facsimiles and an editable rendition of the annotations of the selected contributing author's walkthrough version.

Action 635 specifies receiving the publisher's acceptance of an edited activity step in the selected contributing author's version of the walkthrough.

Action 640 specifies applying at least the publisher accepted activity step to the live application to update the step facsimiles.

Computer System

FIG. 7 is a block diagram of an example computer system 700. FIG. 7 is a block diagram of an example computer system, according to one implementation. The processor can be an ASIC or RISC processor. It can be an FPGA or other logic or gate array. It can include graphic processing unit (GPU) resources. Computer system 710 typically includes at least one processor 772 that communicates with a number of peripheral devices via bus subsystem 750. These peripheral devices may include a storage subsystem 726 including, for example, memory devices and a file storage subsystem, user interface input devices 738, user interface output devices 778, and a network interface subsystem 776. The input and output devices allow user interaction with computer system 710. Network interface subsystem 776 provides an interface to outside networks, including an interface to corresponding interface devices in other computer systems.

User interface input devices 738 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 710.

User interface output devices 778 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules and methods described herein. These software modules are generally executed by processor 772 alone or in combination with other processors.

Memory 722 used in the storage subsystem can include a number of memories including a main random access memory (RAM) 734 for storage of instructions and data during program execution and a read only memory (ROM) 732 in which fixed instructions are stored. A file storage subsystem 736 can provide persistent storage for program and data files, and may include a hard disk drive, a floppy disk drive along with associated removable media, a CDROM drive, an optical drive, or removable media cartridges. The modules implementing the functionality of certain implementations may be stored by file storage subsystem 736 in the storage subsystem 726, or in other machines accessible by the processor.

Bus subsystem 750 provides a mechanism for letting the various components and subsystems of computer system 710 communicate with each other as intended. Although bus subsystem 350 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

Particular Implementations

In one implementation, a method is described of collaborative editing of a multi-step activity walkthrough, wherein steps in the walkthrough demonstrate interaction with a user interface for each of a plurality of contributing authors, creating an editable version of a publisher's base walkthrough of a live application and storing the contributing author's walkthrough version. For this method, the publisher's base and contributing authors' walkthrough versions include multiple activity steps of user interaction with interface panels and annotations to graphically overlay the interface panels for at least some of the activity steps. The method includes receiving and storing edited contributing authors' walkthrough versions; and transmitting, towards the publisher, data for display that elicits selection among the plurality of contributing authors' walkthrough versions. The disclosed method includes receiving the publisher's selection of at least one contributing author's walkthrough version to use in updating the publisher's base walkthrough; and transmitting modifiable data for display that includes step facsimiles and an editable rendition of the annotations of the selected contributing author's walkthrough version. This method further includes receiving the publisher's acceptance of an edited activity step in the selected contributing author's version of the walkthrough and applying at least the publisher accepted activity step to the live application to update the step facsimiles. In some implementations this method further includes applying activity steps subsequent to the edited activity step to update the step facsimiles using and updating the step facsimiles data for display.

In some implementations, this method includes a live application that is a cloud-based software as a service offering and the interactions with the live application exercise controls on web pages generated by the live application. In other implementations, the interactions with the live application exercise controls on app panels of the live application. In some implementations, this method further includes sample data entry values that are stored for the steps that implement a running walkthrough without live user data entry.

In some implementations, this method includes transmitting first modifiable data for display applying the publisher's base walkthrough version and second modifiable data for display applying the selected contributing author's walkthrough version, wherein the first and second data for display both are to be displayed simultaneously within a single user interface. In some implementations, this method further includes transmitting controls that implement drag-and-drop updating of a selected activity of the publisher's base walkthrough version with material from the contributing author's walkthrough version. In some implementations, this method also includes transmitting controls that implement drag-and-drop inserting of a selected step from the contributing author's walkthrough version between steps of the publisher's base walkthrough version.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Other implementations may include tangible computer-readable memory including computer program instructions that cause a computer to implement any of the methods described above. Yet another implementation may include a system including memory and one or more processors operable to execute instructions, stored in the memory, to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method for collaborative editing of a walkthrough, comprising:
    identifying a publisher's base walkthrough of a live application, wherein the publisher's base walkthrough of the live application implements a series of activity steps that are configurable to be presented on an instruction layer that visually overlays the live application;
    implementing a flow of control among the series of activity steps to coordinate presentation of the series of activity steps on the instruction layer that overlays a display generated by the live application;
    interacting with the live application and advancing through the series of activity steps based at least in part on performance by a user in accordance with instructions presented in the series of activity steps on the instruction layer;
    creating and separately storing edited versions of the publisher's base walkthrough for each of one or more contributing authors, wherein the edited versions each propose respective edits to the series of activity steps or the flow of control among the series of activity steps; and
    presenting, to the publisher, a user interface that displays the edited versions of the publisher's base walkthrough, wherein the each of the edited versions are operable by the publisher via the user interface to advance through the respective edits to the series of activity steps or the flow of control among the series of activity steps.

2. The method of claim 1, further comprising:
    simultaneously presenting the edited versions of the publisher's base walkthrough to the publisher; and
    receiving, from the publisher, edits to the publisher's base walkthrough based on selective acceptance of edits from one or more of the edited versions of the publisher's base walkthrough.

3. The method of claim 1, further comprising:
    transmitting modifiable data that includes step facsimiles and an editable rendition of the series of activity steps based at least in part on the edited versions of the walkthrough; and receiving, from the publisher, acceptance of an edited activity step and applying at least the edited activity step to the live application to update the step facsimiles.

4. The method of claim 1, further comprising:
transmitting a first instance of modifiable data applying the publisher's base walkthrough and a second instance of modifiable data applying an edited version of the walkthrough, wherein the first instance of modifiable data and the second instance of modifiable data are to be displayed simultaneously within a single user interface.

5. The method of claim 4, further comprising:
implementing, by a drag-and-drop insertion, a selected step from the edited version of the walkthrough between steps of the publisher's base walkthrough.

6. The method of claim 4, further comprising:
updating, by a drag-and-drop insertion, a selected activity of the publisher's base walkthrough with material from the edited version of the walkthrough.

7. The method of claim 1, wherein the live application is a cloud-based software, and the interactions with the live application exercise controls on web pages generated by the live application.

8. The method of claim 1, wherein the live application is a cloud-based software, and the interactions with the live application exercise controls on app panels of the live application.

9. A non-transitory computer-readable medium storing code for collaborative editing of a walkthrough, the code comprising instructions executable by a processor to:
identify a publisher's base walkthrough of a live application, wherein the publisher's base walkthrough of the live application implements a series of activity steps that are configurable to be presented on an instruction layer that visually overlays the live application;
implement a flow of control among the series of activity steps to coordinate presentation of the series of activity steps on the instruction layer that overlays a display generated by the live application;
interact with the live application and advance through the series of activity steps based at least in part on performance by a user in accordance with instructions presented in the series of activity steps on the instruction layer;
create and separately store edited versions of the publisher's base walkthrough for each of one or more contributing authors, wherein the edited versions each propose respective edits to the series of activity steps or the flow of control among the series of activity steps; and
present, to the publisher, a user interface that displays the edited versions of the publisher's base walkthrough, wherein the each of the edited versions are operable by the publisher via the user interface to advance through the respective edits to the series of activity steps or the flow of control among the series of activity steps.

10. The non-transitory computer-readable medium of claim 9, wherein the instructions are further executable to:
simultaneously present the edited versions of the publisher's base walkthrough to the publisher; and
receive, from the publisher, edits to the publisher's base walkthrough based on selective acceptance of edits from one or more of the edited versions of the publisher's base walkthrough.

11. The non-transitory computer-readable medium of claim 9, wherein the instructions are further executable to:
transmit modifiable data that includes step facsimiles and an editable rendition of the series of activity steps based at least in part on the edited versions of the walkthrough; and
receive, from the publisher, acceptance of an edited activity step and apply at least the edited activity step to the live application to update the step facsimiles.

12. The non-transitory computer-readable medium of claim 9, wherein the instructions are further executable to:
transmit a first instance of modifiable data applying the publisher's base walkthrough and a second instance of modifiable data applying an edited version of the walkthrough, wherein the first instance of modifiable data and the second instance of modifiable data are to be displayed simultaneously within a single user interface.

13. The non-transitory computer-readable medium of claim 12, wherein the instructions are further executable to:
implement, by a drag-and-drop insertion, a selected step from the edited version of the walkthrough between steps of the publisher's base walkthrough.

14. The non-transitory computer-readable medium of claim 12, wherein the instructions are further executable to:
update, by a drag-and-drop insertion, a selected activity of the publisher's base walkthrough with material from the edited version of the walkthrough.

15. The non-transitory computer-readable medium of claim 9, wherein the live application is a cloud-based software, and the interactions with the live application exercise controls on web pages generated by the live application.

16. The non-transitory computer-readable medium of claim 9, wherein the live application is a cloud-based software, and the interactions with the live application exercise controls on app panels of the live application.

17. An apparatus for collaborative editing of a walkthrough, comprising:
a processor,
memory in electronic communication with the processor; and
instructions stored in the memory and executable by the processor to cause the apparatus to:
identify a publisher's base walkthrough of a live application, wherein the publisher's base walkthrough of the live application implements a series of activity steps that are configurable to be presented on an instruction layer that visually overlays the live application;
implement a flow of control among the series of activity steps to coordinate presentation of the series of activity steps on the instruction layer that overlays a display generated by the live application;
interact with the live application and advance through the series of activity steps based at least in part on performance by a user in accordance with instructions presented in the series of activity steps on the instruction layer;
create and separately store edited versions of the publisher's base walkthrough for each of one or more contributing authors, wherein the edited versions each propose respective edits to the series of activity steps or the flow of control among the series of activity steps; and
present, to the publisher, a user interface that displays the edited versions of the publisher's base walkthrough, wherein the each of the edited versions are operable by the publisher via the user interface to advance through the respective edits to the series of activity steps or the flow of control among the series of activity steps.

* * * * *